United States Patent
Harter

(10) Patent No.: US 11,084,176 B2
(45) Date of Patent: Aug. 10, 2021

(54) HOLDING DEVICE FOR A SUCTION GRIPPER FOR A VACUUM HANDLING APPARATUS

(71) Applicant: J. Schmalz GmbH, Glatten (DE)

(72) Inventor: Leonhard Harter, Lossburg (DE)

(73) Assignee: J. Schmalz GmbH, Glatten (DE)

( * ) Notice: Subject to any disclaimer, the term of this patent is extended or adjusted under 35 U.S.C. 154(b) by 180 days.

(21) Appl. No.: 16/398,826

(22) Filed: Apr. 30, 2019

(65) Prior Publication Data

US 2019/0344453 A1 Nov. 14, 2019

(30) Foreign Application Priority Data

May 14, 2018 (DE) ...................... 10 2018 111 487.7

(51) Int. Cl.
*B25J 15/06* (2006.01)
*B25J 15/04* (2006.01)

(52) U.S. Cl.
CPC ....... *B25J 15/0683* (2013.01); *B25J 15/0408* (2013.01)

(58) Field of Classification Search
CPC .... B25J 15/0616; B25J 15/0683; B25J 15/04; B25J 15/0408; Y10T 403/58; Y10T 403/599; Y10T 403/7015; Y10T 403/7049; F16B 47/00; F16B 47/006
See application file for complete search history.

(56) References Cited

U.S. PATENT DOCUMENTS

| | | | |
|---|---|---|---|
| 4,957,318 A * | 9/1990 | Blatt ...................... | B65G 47/91 248/205.9 |
| 6,182,491 B1 | 2/2001 | Perlman et al. | |
| 6,213,521 B1 * | 4/2001 | Land ...................... | F16L 37/244 285/317 |
| 6,713,521 B2 | 3/2004 | Chiba et al. | |
| 8,132,312 B2 | 3/2012 | Dellach | |
| 2008/0116338 A1 * | 5/2008 | Kalb ...................... | F16B 47/00 248/205.9 |
| 2017/0275104 A1 * | 9/2017 | Tell ........................ | B65G 47/91 |

OTHER PUBLICATIONS

Buind and Fronius: "Welding with Universal Robots, Smartshift and Fronius", YouTube, Mar. 12, 2018, Seiten 1-2, XPO54979685, Gefunden im Internet: URL:https://www.youtube.com/watch?v=FcEgNn5ztyk [gefunden am Sep. 12, 2019] *das ganze Dokument*.
German Office Action, pp. 1-8, dated Oct. 4, 2019.
Non-translated German Office Action, created on Feb. 20, 2019, pp. 1-6. German Application No. 10 2018 111 487.7, filed May 14, 2018.

\* cited by examiner

*Primary Examiner* — Dean J Kramer
(74) *Attorney, Agent, or Firm* — Bond Shoeneck & King, PLLC; George McGuire

(57) ABSTRACT

The invention is a holding device for a suction gripper or for another interface member on a base of a vacuum handling apparatus, wherein the holding device is designed for detachable and preferably tool-free attachment of the suction gripper to the base and has a first direction and a second direction orthogonal thereto.

20 Claims, 3 Drawing Sheets

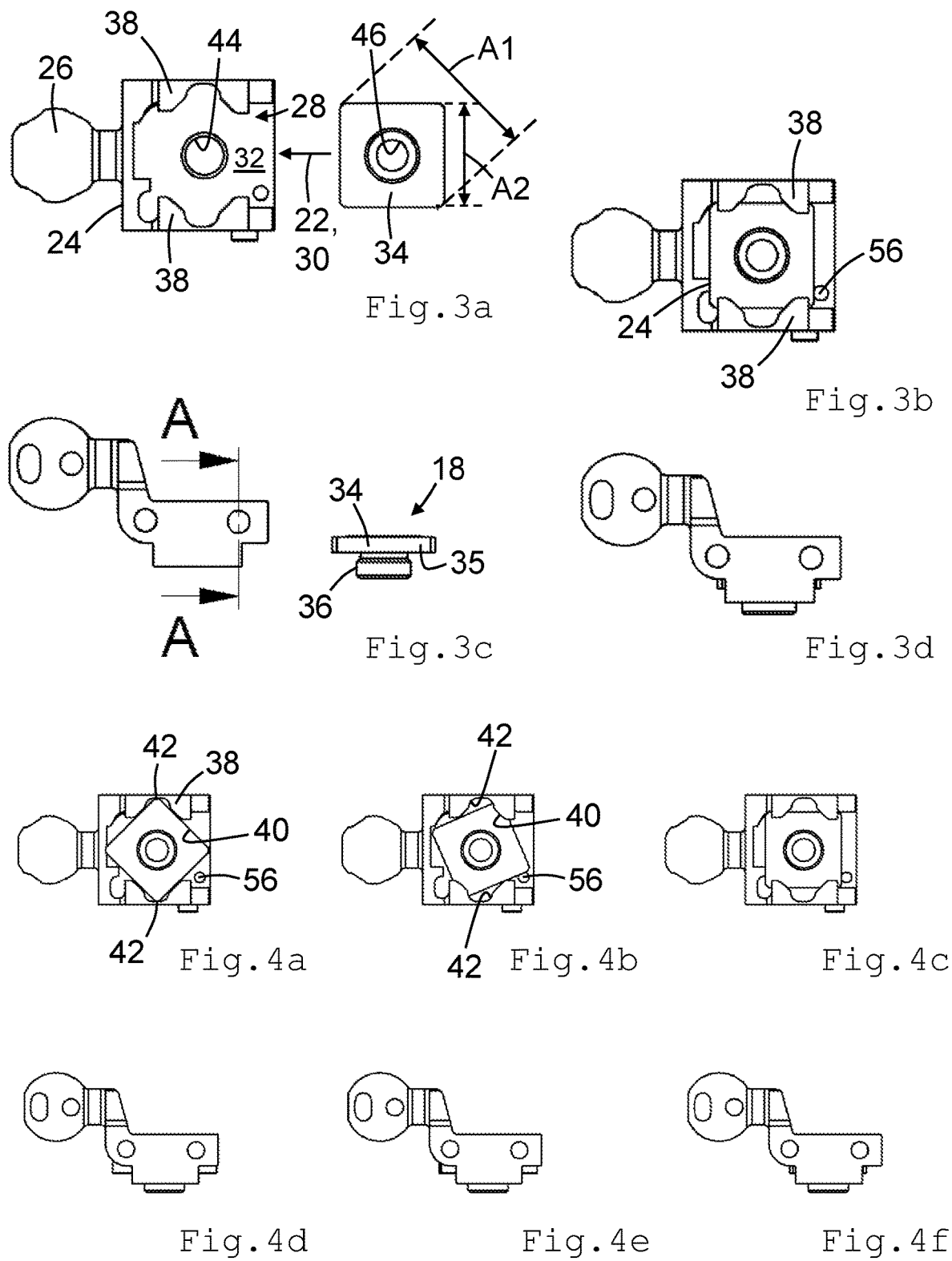

ововdevice for a suction gripper for a vacuum handling apparatus

HOLDING DEVICE FOR A SUCTION GRIPPER FOR A VACUUM HANDLING APPARATUS

CROSS REFERENCE TO RELATED APPLICATIONS

The present application claims priority to German patent application No. 10 2018 111 487.7, filed on May 14, 2018, the entire contents of which is incorporated herein by reference.

DESCRIPTION

The invention relates to a holding device for a suction gripper on a base of a vacuum handling apparatus, wherein the suction gripper for suctioning an object is provided on the vacuum handling apparatus, wherein the holding device is adapted for detachably and preferably tool-free attachment of the suction gripper to the base and has a first direction and a second direction orthogonal thereto, wherein the holding device comprises a base side part and a suction gripper side part.

Vacuum handling apparatuses are devices by means of which loads can be able to be suctioned with the aid of vacuum and thereby gripped, secured or lifted and, if necessary, moved and set down again. A lifting force required for this can be provided in any manner by any lifting apparatus.

In the case of a vacuum handling apparatus under consideration here, various suction grippers can typically be detachably attached by means of the holding device mentioned above. In particular, it is possible to replace used suction grippers with new ones.

If there is talk about suction grippers, this is understood to mean, for example, plate-, cup- or bell-shaped, preferably made of a material that is still dimensionally stable but flexibly deformable, which can then also operable to easily adapt to objects with curved outer contours, such as bags filled with bulk materials, and suck in such objects. However, applications are also conceivable which can be achieved with actually rigid suction grippers, again preferably in the form of plates, cups or bells. The term "suction gripper" therefore refers to the part or region of the vacuum handling apparatus which is attached to an object to be suctioned by applying a vacuum to the suction gripper so that the object is able to be secured and, if necessary, lifted and moved.

According to U.S. Pat. No. 6,213,521 B1, a holding device is designed such that a suction gripper with a flange deviating from a circular shape is inserted in a first axial direction into a base side part of the holding device and is then rotated about the first direction into an intended bayonet-like fastening assembly position.

U.S. Pat. No. 8,132,312 B2 shows a similar situation, wherein here a flange of the suction gripper is formed in the shape of a circular ring and is held in the assembly position by rotation of a rear-gripping flange ring.

It is the object of the present invention to enable attachment and removal of a suction gripper, in particular for replacement purposes, for a vacuum handling apparatus in an even more user-friendly manner, whereby the holding device should nevertheless be economically manufacturable.

This object is achieved by a holding device that serves for holding a suction gripper or other interface element on a base of a vacuum handling apparatus, i.e. to form a detachable assembly connection. With such a vacuum handling apparatus, the suction gripper is usually designed to suction an object. It is therefore desirable to be able to replace the suction gripper. The holding device is designed such that it is possible to attach the suction gripper both by a linear pushing movement in the second direction and alternatively by inserting it in the orthogonal first direction and then twisting it into the assembly position. The first direction is preferably the placement direction of the suction gripper onto the object to be suctioned, which usually extents vertical during operation, but this is by no means mandatory. In many cases, the suction gripper is also designed to be rotationally symmetrical, so that this method of mounting the suction gripper is perceived as convenient by the user. Inserting in the first direction and then twisting around the first direction is found to be easier, e.g. with larger suction grippers. On the other hand, it was shown that e.g. with smaller suction grippers, linear sliding or retraction can be perceived as more pleasant. According to the invention, it proves to be advantageous in any case that it is left to the user in which of the two ways he moves the suction gripper to its intended assembly position or releases it in the opposite direction from its intended assembly position and removes it from the base part of the holding device. One or the other choice of assembly or disassembly can be influenced by the overall design of the vacuum handling apparatus and its weight, location, and accessibility. For example, there are vacuum handling apparatuses with a large number of suction grippers, especially those arranged like arrays, which then tend to be smaller, or those with few or only one very protruding suction gripper. The invention leaves it to the user to assemble or disassemble a suction gripper in the most comfortable way.

As a component of the suction gripper side part of the holding device, the glide shoe is designed such that it is rear-engageable by the sliding seat receptacle during linear sliding. It can be formed by a strut work extending in the sliding plane. However, it also proves to be advantageous if the glide shoe is plate-shaped. When viewed from above in the first direction, it can be roundish, oval or polygonal, especially square, rectangular or hexagonal. In any case, the glide shoe is designed and arranged on the suction gripper such that it is operable to be positively gripped by the sliding seat receptacle.

In a further development of the invention, it is suggested that the glide shoe in the sliding plane has a first dimension (A1) and a second dimension (A2) oblique to the first dimension (A1), which are different from each other.

In the embodiment of the invention, it is suggested that the first dimension (A1) of the glide shoe is larger than the second dimension (A2) obliquely to the first dimension and that the glide shoe is orthogonal to its second dimension (A2) in the sliding direction and is insertable linearly into the sliding seat receptacle up to its intended assembly position. It is therefore suggested that the sliding seat receptacle and the glide shoe are designed so that the glide shoe with its second smaller dimension (A2) is held in the sliding seat receptacle.

It is in no way necessary for the regions enclosing and positively rear-engaging the glide shoe to almost completely encompass the insertion opening except for a sliding opening; it is entirely sufficient when the insertion opening is limited by only two opposing sides, as is the case when the rear-engaging regions are formed by two opposing struts or strips, which are, for example, L-shaped when viewed as a section and in the direction of sliding, as in the case of a dovetail guide. An embodiment of particular importance is proposed which is characterized in that in the regions enclosing and positively rear-engaging the glide shoe at least one and preferably two open-edged cutouts is or are formed extending in the sliding plane and being continuously formed in the first direction by the respective rear-engaging region and delimiting and defining the insertion opening such that the glide shoe is positionable outside the sliding seat receptacle and is orientable such that from there passing through the insertion opening it extends through the cutout when inserted with its larger of the two dimensions. After this further design with open-edge cutouts in the rear-gripping regions of the sliding seat receptacle, the glide shoe with its larger dimension can be oriented according to the position of the cutout(s) and inserted through the cutout(s) into the sliding seat receptacle and then rotated such that it is rear-engaged in the sliding seat receptacle so that the glide shoe and thus the suction gripper are held safely in operation.

As already indicated, it proves to be advantageous if the sliding seat receptacle is designed dovetail-shaped.

It is also advantageous if the suction gripper is molded onto the suction gripper side part of the holding device or clipped onto the suction gripper side part of the holding device or screwed to the suction gripper side part of the holding device. It is also advantageous if the suction gripper side part of the holding device is constituted by the glide shoe and an extension projecting towards the suction gripper. This extension can be nipple-shaped, tubular, clamp-shaped or flange-shaped and can be connected to the suction gripper in any way.

It is also advantageous if the suction gripper side part of the holding device is T-shaped or mushroom-shaped when viewed in the sliding direction, so that the transverse region of the T-shape forms an edge region that is graspable or rear-engageable.

It would be conceivable that the vacuum communication between a vacuum supply of the vacuum handling apparatus and the suction gripper could be realized by any other line means. On the other hand, it is further suggested that the glide shoe and the base side part of the holding device should have a respective flow opening preferably extending in the first direction for flow and vacuum communication with the vacuum handling apparatus. In this way, vacuum communication between the suction gripper and the vacuum handling apparatus takes place via the holding device or through the holding device.

The base side part of the holding device preferably has a housing body forming the sliding seat receptacle.

Once the suction gripper is brought into its intended assembly position, it would be desirable that it does not accidentally become detached again. For this purpose, the sliding seat receptacle and the glide shoe interacting with it could interact in a suitable manner, in particular by forming a clamping connection. It also proves to be advantageous, however, that the base side part of the holding device or the glide shoe has a snap-action, latching or otherwise rear-engaging locking device by means of which the glide shoe is operable to be secured in its intended assembly position in the sliding seat receptacle.

It can be advantageous if the locking device has a manually operated tappet spring-biased to a locking position. To bring the glide shoe into its assembly position, the locking device could be designed such that a user actuates the spring-biased tappet or other spring-biased member against the spring-bias so that the locking device can be released and the glide shoe can be brought into its mounting position or vice versa from its mounting position.

For this purpose, it proves to be further advantageous according to one embodiment if the locking device has a preferably spherical blocking body movable between a release position and a locking position.

According to one embodiment, it proves to be advantageous if the blocking body is able to engage with the sliding seat receptacle in the first direction. In this way, the blocking body blocks the glide shoe such that it cannot be pulled out of the sliding seat receptacle in the direction opposite to the sliding direction on the one hand and on the other hand is prevented from turning back and cannot be unintentionally removed from the insertion opening in the direction opposite to the first direction.

According to a further embodiment, it is proposed that the spring-biased manually operated tappet is preferably adjustable parallel to the sliding plane and that its outer circumference acts on a position of the blocking body or defines or limits this position. The outer circumference of the tappet thus acts as a cam track for the blocking body.

According to a further embodiment, it is proposed that the locking device is formed by a housing body of the base side part of the holding device having a through opening closed on one side by an insert or a blind opening into which a spring element and a tappet is inserted, wherein the tappet projects to the outside the housing body and is manually operable there, and wherein the tappet itself or a locking body operable by the tappet is engageable into the sliding seat receptacle in order to secure the glide shoe in its intended assembly position in the sliding seat receptacle. In this way, the locking device can be manufactured with few parts and relatively little manufacturing effort. In addition to the through an opening or blind hole opening, only a transverse opening must be made towards the sliding seat receptacle, through which the preferably spherical blocking body engages in the sliding seat receptacle.

In a vacuum handling apparatus, the base side part of the holding device can be attachable to the base of the device in any way per se, i.e. by any assembly connections per se. It can be advantageous if the base side part of the holding device has a housing body with a vacuum communicating connection to the base of the vacuum handling apparatus.

Furthermore, the subject of the present invention is a vacuum handling apparatus. It should be expressly pointed out here that the holding device described above is not only suitable for the detachable attachment of suction grippers, but also for the detachable attachment of other interface elements used in vacuum handling apparatuses, such as, in particular, buttons, spring tappets or sensors. Independent protection is also claimed for such holding devices, whereby the suction gripper side part of the holding device then is an interface member-side part of the holding device.

Further details, features, and advantages of the invention result from the attached patent claims and from the graphic illustration and subsequent description of a preferred embodiment of the invention.

FIGS. 3a, b show a view from below of the holding device according to the invention to illustrate how the glide shoe is slid on;

FIGS. 3c, d show a side view of the holding device according to FIGS. 3a, 3b;

FIGS. 4a, b, c show views from below of the holding device in according to the invention to illustrate the insertion and subsequent twisting of the glide shoe; and FIGS. 4d, e, f show side views of FIGS. 4a, b, c.

Figure 1:
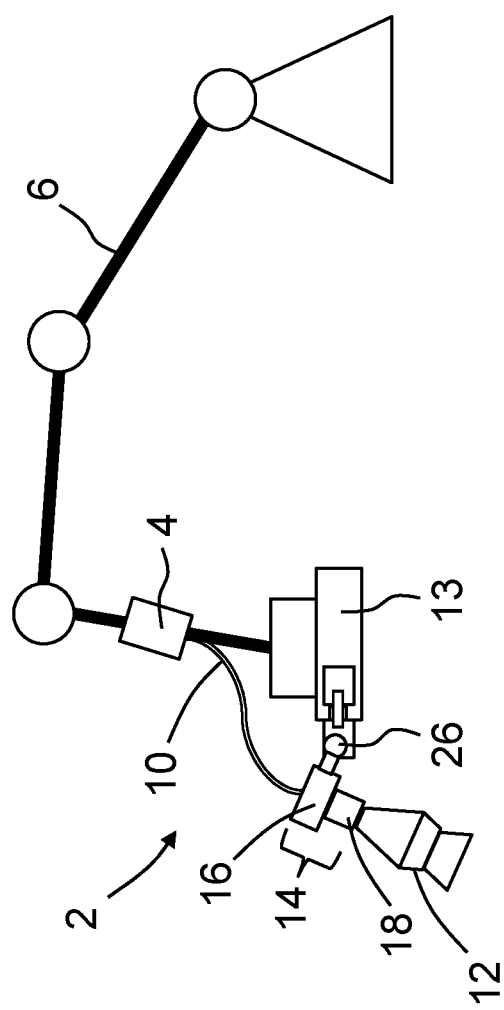
FIG. 1 shows a schematic illustration of a vacuum handling apparatus.

FIG. 1 shows a schematic illustration of a vacuum handling apparatus 2. The vacuum handling apparatus 2 comprises a vacuum generating apparatus 4 and a support device 6, as well as valve apparatuses which are not represented, are known per se and therefore not to be described in detail, and control mechanisms for controlling the vacuum on one or more suction grippers 12 for suctioning objects in order to secure, raise or displace them by means of the vacuum handling device 2. In order to supply vacuum from the vacuum generating apparatus four to the suction gripper(s) 12, a line 10 which is operable to receive a vacuum is illustrated. The support device 6 can have freely adjustable axes, in particular robot axes, which is only indicated by circles and lines in FIG. 1. The support device 6 holds a base 13 of the vacuum handling apparatus 2, on which one or preferably several suction grippers 12 are detachably arranged in a manner still to be described. This base 13 can, for example, be made up of a construction of one or more profiles and, in particular, can be designed to extend over a wide area, so that several suction grippers 12 can be arranged at variable points according to the size of the object to be suctioned.

The suction gripper 12 shown in FIG. 1 can preferably be attached to and removed from the base 13 of the vacuum handling apparatus 2 tool-free by means of a holding device 14, in accordance with the invention and only schematically indicated in FIG. 1, for example if the suction gripper 12 is worn out and has to be replaced by a new one.

Figure 2A:
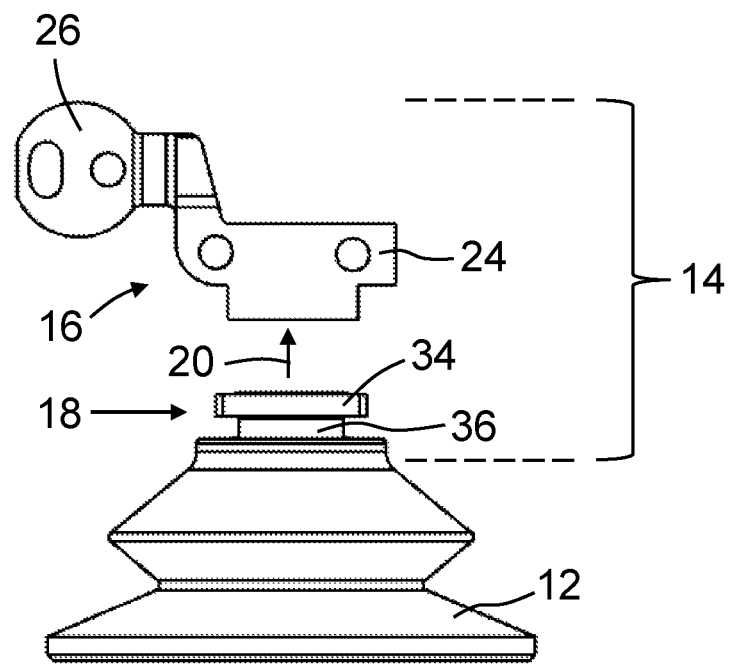
FIG. 2a shows a side view of a suction gripper for a vacuum handling apparatus, e.g. according to FIG. 1, and a holding device according to the invention.

FIG. 2a shows a side view of the suction gripper 12 and the holding device 14 according to the invention. The holding device 14 comprises a base side part 16 and a suction gripper side part 18. It comprises a first direction 20 and a second direction 22 orthogonal thereto, extending orthogonal to the drawing plane of FIG. 2a, but indicated in FIG. 3a.

The base side part 16 comprises a housing body 24 which, as an example, has a spherical attachment 26 which is attachable to the base 13 in a coupling device (not shown) in FIG. 2. This is purely exemplary. The base part 16 of the holding device 14 can also be mounted in other ways on an operating device 10 or an interface in the region of the lower end of the lifting hose 8.

Figure 2B:
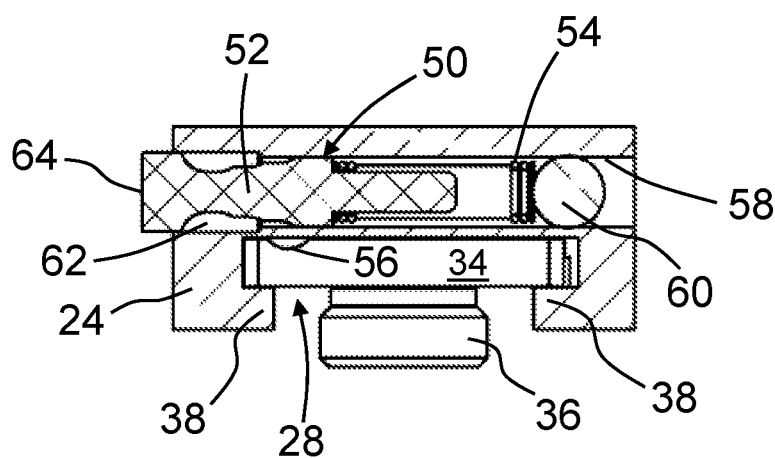
FIG. 2b shows a sectional view of the holding device according to the invention (without suction grippers with sectional plane A-A in FIG. 3c)

According to the invention, the base part 16 of the holding device 14 comprises a sliding seat receptacle 28, which can be seen in FIGS. 2b and 3a, b. The sliding seat receptacle 28 comprises a sliding direction 30 extending in the second direction 22. The suction gripper side part 18 of the holding device 14 comprises a glide shoe 34 arrangeable in a sliding plane 32 of the sliding seat receptacle 28 and, in the case shown in the example, is plate-shaped. The glide shoe 34, viewed from above in the first direction 20, is square in shape and forms a flange that can be engaged from behind in the first direction 20. On the suction gripper side, the glide shoe 34 has an exemplary tubular shoulder 36 protruding in the direction of the suction gripper, against which the suction gripper 12 is molded according to a design version. However, a clip or snap-on connection or a screw clamp connection or the like between the suction gripper side part 18 and the suction gripper 12 is also conceivable.

As can be seen from FIGS. 2b and 3a, b, the sliding seat receptacle 28 comprises regions 38 enclosing the glide shoe 34 and positively rear-engaging it in the first direction 20. To slide the suction gripper side part 18 onto the sliding seat receptacle 28, the suction gripper 12 is oriented such that the glide shoe 34 can be inserted into the sliding seat receptacle 28 in the second direction 22. FIG. 3b shows the glide shoe in its intended assembly position, in which it abuts in the second direction 22 against an end stop in the sliding seat receptacle 28 or in the housing body 24. In this position, the glide shoe 34 is secured against detaching in a manner to be explained.

The holding device 14 according to the invention can, however, be operated in another way, as shown in FIGS. 4a to f. The glide shoe 36 has a first dimension A1 in the sliding plane 32 and a second dimension A2 at an angle to the first dimension A1 (FIG. 3a). The already mentioned regions 38 of the sliding seat receptacle 28 enclosing the glide shoe 34 and rear-engage it in the first direction, delimit a free cross-section between them, which forms an insertion opening 40 for the glide shoe 34, whereby the insertion direction corresponds to the first direction 20. Furthermore, two opposing open-edge cutouts 42 are formed in the regions 38 positively rear-engaging the glide shoe 34, which are open-edged toward the insertion opening 40. The insertion opening 40, the cutouts 42 and the dimensions A1 and A2 of the glide shoe 34 are such that the glide shoe 34 can be inserted in the first direction 20 through the cutouts 42 into the sliding seat receptacle 28 in the orientation shown in FIG. 4a, i.e. with its larger dimension A1. As shown in FIGS. 4b, c, the glide shoe 34 is then operable to be turned into its intended assembly position by the first direction 20.

The holding device 14, in accordance with the invention, therefore allows in two different ways to move the suction gripper 12 or its glide shoe 34 into the intended assembly position shown in FIGS. 3b and 4c or to release it from this position. The suction gripper 12 can either be pushed into the sliding seat receptacle 28 or inserted in the first direction 20 through the insertion opening 40 into the sliding seat receptacle 28 and then turned to the intended mounting position.

In the illustrated embodiment of the holding device 14 according to the invention, both the base side part 16 and the suction gripper side part 18 have a flow opening 44 and 46, respectively, for vacuum communication between the hose interior 9 of the lifting hose 8 and the suction gripper 12.

A locking device 50 is further provided for the base part 16 of the holding device 14 according to the invention. It comprises a spring-biased manually actuated tappet 52 and its spring element 54 as well as a spherical blocking body 56, which, depending on the position of the tappet 52, can extend more or less far in the first direction 20 into the sliding seat receptacle 28. The blocking body 56 protruding into the sliding seat receptacle 28 is indicated in FIG. 2b, but also 3a, b and 4a-c. When it extends into the sliding seat receptacle 28 in the first direction 20, it prevents the glide shoe 34 from being pulled out of the sliding seat receptacle 28 again against the sliding direction 22 or from being turned back into the orientation shown in FIGS. 3a, b. It is thus secured in the sliding seat receptacle in its intended assembly position, which ensures safe operation of the vacuum handling apparatus. The above mentioned components of the locking device 50 are arranged and formed by the housing body 24 of the base side part 16 of the holding device having a through opening 58 which is closed on one side by a pressed-in body 60, which can be spherical, for example. The spring element 54 is supported against the spherical body 60. The tappet 52 comprises a preferably rotationally symmetrical recess on its outer circumference, which forms a cam track 62 for the blocking body 56. The tappet protrudes with a manually operated end 64 from this through opening 58 and is biased in this direction. However, he is prevented from coming out further by the blocking body 56 that interacts with his cam track 62. Due to the spring-bias, the blocking body 56 is biased into the locking position, in which it projects into the sliding seat receptacle 58, as shown in FIG. 2b. In order to be able to push the glide shoe 34 into its intended assembly position or to release it again or to turn it into its intended assembly position and turn it back, a user must press the tappet 52 slightly into the opening 58 so that the blocking body 56 can be released from the sliding seat receptacle 28 or displaced by the glide shoe. When subsequently released, the tappet or the blocking body 56 engages again in the locking position.

What is claimed is:

1. A holding device for a suction gripper at a base of a vacuum handling apparatus,
    wherein the holding device is designed for detachable attachment of the suction gripper to the base and has a first direction and a second direction orthogonal thereto,
    wherein the holding device comprises a base side part and a suction gripper side part,
    wherein the base side part comprises a sliding seat receptacle for the suction gripper side part, wherein a sliding plane and a sliding direction are defined,
    wherein the suction gripper side part comprises a glide shoe which is configured to be arranged in the sliding plane of the sliding seat receptacle, which, in the sliding direction and in a positively rear-engaging position with the sliding seat receptacle, is slideable linearly into its intended assembly position on the base side part,
    wherein the sliding direction of the sliding seat receptacle extends in the second direction,
    wherein the sliding seat receptacle has regions enclosing and positively rear-engaging the glide shoe, which additionally delimit an insertion opening extending in the first direction,
    wherein the sliding seat receptacle and the insertion opening and the glide shoe are designed such that the glide shoe is slideable into the sliding seat receptacle in the second direction and also, alternatively thereto, is insertable into the sliding seat receptacle in the first direction through the insertion opening and is then rotatable about the first direction into the rear-engaging position and intended assembly position in the sliding seat receptacle.

2. The holding device according to claim 1, characterized in that the glide shoe is plate-shaped.

3. The holding device according to claim 1, characterized in that the glide shoe, viewed in plan view in the first direction, is designed polygonal.

4. The holding device according to claim 1, characterized in that the glide shoe has in the sliding plane a first dimension (A1) and a second dimension (A2) oblique to the first dimension (A1) which are different from one another.

5. The holding device according to claim 4, characterized in that the first dimension (A1) of the glide shoe is larger than the second dimension (A2) and in that the glide shoe is linearly slideable into the sliding seat receptacle orthogonally to its second dimension (A2) in the sliding direction up to its intended assembly position.

6. The holding device according to claim 5, characterized in that, in the regions enclosing and positively rear-engaging the glide shoe, at least one open-edge cutout is formed extending in the sliding plane and being continuous in the first direction through the respective rear-engaging region and delimiting and defining the insertion opening such that the glide shoe is positionable outside the sliding seat receptacle and orientable such that from there passing through the insertion opening it extends through the cutout when inserted with its larger (A1) of the two dimensions (A1, A2).

7. The holding device according to claim 1, characterized in that the sliding seat receptacle is designed dovetail-shaped.

8. The holding device according to claim 1, characterized in that the suction gripper is molded onto the suction gripper side part of the holding device.

9. The holding device according to claim 1, characterized in that the suction gripper side part of the holding device is formed by the glide shoe and a projection projecting therefrom in the direction of the suction gripper.

10. The holding device according to claim 1, characterized in that the glide shoe and the base side part of the holding device have a respective flow opening extending in the first direction for flow and vacuum communication with the vacuum handling apparatus.

11. The holding device according to claim 1, characterized in that the base side part of the holding device has a rear-engaging locking device by means of which the glide shoe is operable to be secured in its intended assembly position in the sliding seat receptacle.

12. The holding device according to claim 11, characterized in that the locking device has a manually actuatable tappet which is spring-biased into a locking position.

13. The holding device according to claim 11, characterized in that the locking device has a spherical blocking body which is moveable between a release position and a locking position.

14. The holding device according to claim 11, wherein a blocking body is operable to engage in the sliding seat receptacle in the first direction.

15. The holding device according to claim 14, wherein a spring-biased manually actuatable tappet is adjustable parallel to the sliding plane and, thus acting with its outer circumference on a position of the blocking body.

16. The holding device according to claim 11, characterized in that the locking device is formed in that a housing body of the base side part of the holding device has one of a through-opening closed on one side by an insert or a blind hole opening into which a spring element and a tappet is inserted, the tappet projecting outside the housing body and being manually operable there, and one of the tappet itself or a locking body operable by the tappet being engageable in the sliding seat receptacle in order to secure the glide shoe in its intended assembly position in the sliding seat receptacle.

17. The holding device according to claim 1, characterized in that the base side part of the holding device has a housing part with a vacuum communicating connection to the base of the vacuum handling apparatus.

18. A vacuum handling apparatus comprising a base and comprising a suction gripper, which detachably attachable to the base, for suctioning an object onto the vacuum handling apparatus, characterized by a holding device for the suction gripper at the base of a vacuum handling apparatus,
    wherein the holding device is designed for detachable attachment of the suction gripper to the base and has a first direction and a second direction orthogonal thereto,
    wherein the holding device comprises a base side part and a suction gripper side part, wherein the base side part comprises a sliding seat receptacle for the suction gripper side part, wherein a sliding plane and a sliding direction are defined, wherein the suction gripper side part comprises a plate-shaped glide shoe which is configured to be arranged in the sliding plane of the sliding seat receptacle, which, in the sliding direction and in a positively rear-engaging position with the sliding seat receptacle, is slideable linearly into its intended assembly position on the base side part, wherein the sliding direction of the sliding seat receptacle extends in the second direction, wherein the sliding seat receptacle has regions enclosing and positively rear-engaging the glide shoe, which additionally delimit an insertion opening extending in the first direction, wherein the sliding seat receptacle and the insertion opening and the glide shoe are designed such that the glide shoe is slideable into the sliding seat receptacle in the second direction and also, alternatively thereto, is insertable into the sliding seat receptacle in the first direction through the insertion opening and is then rotatable about the first direction into the rear-engaging position and intended assembly position in the sliding seat receptacle.

19. The vacuum handling apparatus according to claim 18, characterized in that a flow communication is formed between the suction gripper and the vacuum handling apparatus through the holding device.

20. The vacuum handling device according to claim 18, further characterized by an additional interface member which has a glide shoe designed corresponding to the glide shoe of the suction gripper, so that the additional interface member is operable to be mounted in the sliding seat receptacle of the base side part of the holding device for the suction gripper or in a further sliding seat receptacle corresponding to the glide shoe.

* * * * *